(12) United States Patent
Hofbauer (10) Patent No.: US 7,509,937 B2
(45) Date of Patent: Mar. 31, 2009

(54) PISTON RING, PISTON SKIRT AND CYLINDER LINER LUBRICATION SYSTEM AND METHOD FOR AN INTERNAL COMBUSTION ENGINE

(75) Inventor: Peter Hofbauer, West Bloomfield, MI (US)

(73) Assignee: Advanced Propulsion Technologies, Inc., Goleta, CA (US)

( * ) Notice: Subject to any disclaimer, the term of this patent is extended or adjusted under 35 U.S.C. 154(b) by 44 days.

(21) Appl. No.: 11/818,301

(22) Filed: Jun. 13, 2007

(65) Prior Publication Data

US 2008/0041346 A1     Feb. 21, 2008

Related U.S. Application Data (60) Provisional application No. 60/815,718, filed on Jun. 22, 2006.

(51) Int. Cl.
*F01M 1/02* (2006.01)

(52) U.S. Cl. ............ 123/196 R; 417/211; 184/18; 92/156

(58) Field of Classification Search ......... 123/196 R; 417/211; 92/156; 184/18
See application file for complete search history.

(56) References Cited

U.S. PATENT DOCUMENTS 2,843,221 A * 7/1958 Haring ................. 184/18
6,170,443 B1   1/2001 Hofbauer

FOREIGN PATENT DOCUMENTS

JP     57079206 A * 5/1982

* cited by examiner

*Primary Examiner*—Noah Kamen
(74) *Attorney, Agent, or Firm*—Paul K. Godwin (57) ABSTRACT

An improved lubrication system and method for an internal combustion engine that includes an inertia pump in a piston that reacts to the movement of the piston and conveys a predetermined measure of lubricating oil to the space between the piston and its adjacent cylinder wall immediately below the upper piston rings as the piston reaches top dead center of its stroke cycle. A first embodiment utilizes check valves to responsively open and close passages for the pump in order to control the injection of the proper amount of oil during each cycle. A second embodiment relies on a single moving plunger mass element to provide both the pumping and the valving functions of the inertia pump. A third embodiment utilizes throttle valves to control the injection of the proper amount of oil and allow for a spill path without additional passages. A fourth embodiment utilizes a throttle valve and a check valve in combination to provide secure pumping and a spill path for excess oil.

23 Claims, 12 Drawing Sheets

PISTON RING, PISTON SKIRT AND CYLINDER LINER LUBRICATION SYSTEM AND METHOD FOR AN INTERNAL COMBUSTION ENGINE

RELATED APPLICATION

This application claims benefit of U.S. provisional application Ser. No. 60/815,718, filed Jun. 22, 2006.

TECHNICAL FIELD

This invention is related to the field of internal combustion engines and more specifically to a lubrication system and method for supplying lubricating oil to the piston rings, piston skirt and cylinder liners of 2-cycle engines.

BACKGROUND

Some conventional internal combustion engines are configured to spray or splash lubricating oil on the cylinder walls or piston liners over which the piston rings travel during the exhaust/compression stroke cycle of the engine.

In some 2-cycle engines, such as the Internal Combustion Engine With A Single Crankshaft And Having Opposing Cylinders And Opposing Pistons in each cylinder ("OPOC engine") described in my U.S. Pat. No. 6,170,443 and incorporated herein by reference, lubricating oil is pumped through passages in the crankshaft and connecting rods to the piston pins. However, conventional systems spray or splash crankcase oil into the cylinder area below the piston rings to effect wetting of the liner surfaces. In such lubrication systems, the piston rings pick up the lubricating oil as they pass over the wetted liner surfaces and carry it forward in the direction of the combustion chamber as the piston travels from bottom dead center ("BDC") towards top dead center ("TDC"). With each stroke, oil is carried past the exhaust and inlet ports of the cylinder.

There is a need to improve the lubrication system as it applies to 2-cycle engines, since if the liner is too wet, the piston rings carry too much oil forward into the scavenging ports and into the combustion chamber. This results in loss of oil through the exhaust ports (HC emissions). Also, the moving of oil past the intake ports causes some oil to be carried into the combustion chamber, which alters the combustion process. Conversely, if insufficient oil is transported by the piston rings, then excessive wear results.

SUMMARY

The present invention provides several improvements to the lubricating systems of 2-cycle engines. Four embodiments are shown which utilize an inertia pump in each piston to regulate and inject the proper amount of oil into the space between the piston cylinder liner and the lower piston ring of the upper set of piston rings near the piston crown as the piston is completing its compression stroke on its way to reaching TDC. This continues also during the first portion of the expansion stroke. This point of injecting lubricating oil effectively lubricates the top of the travel of the piston rings and allows the injected lubricating oil to be drawn down the liner walls in a controlled manner, but not past the exhaust and intake ports.

In a first embodiment, check valves are employed along with a plunger in an inertia pump. One check valve acts to regulate the flow of oil from a supply source into the pumping portion of the pump chamber when the piston decelerates while approaching its BDC in the later part of the expansion stroke and during the acceleration that occurs during the early portion of the compression stroke. A second check valve acts to allow the inertia pump to release the oil from the piston port in reaction to the inertia caused movement of the pump plunger as the piston decelerates during the later portion of the compression stroke while approaching TDC and during the acceleration that occurs during the early portion of the expansion stroke. A separate spill passage allows excess oil to be returned to the source.

In a second embodiment, a pump plunger is the sole moving component of an inertia pump and is configured to act as both the pump and the valving mechanism as it is subject to inertia induced reciprocating motion within the pump chamber. In a first position, when the piston is decelerating during the later portion of its expansion cycle and approaching BDC, the pump plunger through inertia, is positioned at one extreme end of the pump chamber and opens a path for oil from a supply source to flow into the pump displacement in the pumping portion of the pump chamber. In that position, there is no path for the oil to flow to the cylinder liner. As the stroke of the piston continues its compression stroke past BDC, the pump plunger holds that position until there is sufficient deceleration to cause the pump plunger to move away from that one extreme end. In doing so, the pump plunger closes the flow path of oil from the supply source. As the piston decelerates during the later portion of the compression stroke approaching TDC, it causes the pump plunger to move, through its mass inertia, to the opposite end of the pump chamber. In this embodiment, the plunger acts to keep the path from the supply source closed and opens a flow path between the pump displacement portion of the pump chamber and the piston oil outlet port. In this manner, a predetermined amount of oil is injected into the space below the lower piston ring, of the upper set of rings, just as the piston reaches TDC and after. A spill passage allows for excess oil to be bled from the pump chamber and return to the source.

In a third embodiment, throttle valves are employed at both the inlet and the outlet of the inertia pump to control the flow of oil both during the charging of the pump and during the injecting by the pump. A first throttle valve is located in the passage formed between the source and the pump displacement chamber to allow low restriction to the flow of oil during the charging cycle that takes place while the associated piston mass is decelerating towards BDC during the expansion stroke and accelerating away from BDC during the compression stroke of the engine. During the deceleration portion, towards BDC, the inertia pump creates a relative vacuum that causes oil to be pulled into the pump displacement chamber. This applies forward forces to the first throttle valve that cause it to become relatively open. The minor vacuum has the opposite effect on the second throttle valve which is located at the pump outlet. The vacuum causes reverse forces to be applied to the second throttle valve and it becomes relatively closed. When the pump starts to pump oil as the piston approaches TDC, the second throttle valve at the outlet becomes relatively open and the first throttle valve becomes relatively closed. However, due to the nature of throttle valves they do not become completely closed and therefore, the first throttle valve allows for proportioned and excess oil to spill back to the source when the pump plunger is driven by inertia to inject a predetermined volume of oil through the second throttle valve at the pump outlet. This embodiment has the advantage of not requiring a separate passage for spill oil return of oil to the source.

In a fourth embodiment, similar to the third embodiment, a single throttle valve is employed at the inlet to the inertia pump, while a check valve is employed at the outlet of the inertia pump. In this embodiment, the throttle valve acts as a 2-way valve having different flow characteristics for forward and reverse flow, while the check valve has fully open and fully closed positions to prevent drawing oil from the cylinder wall during the charge phase of the pump. This embodiment also has the advantage of not requiring a separate spill passage and also prevents reverse draw at the outlet port during the charge cycle of the pump.

It is an object of the present invention to provide an improved lubricating system and method for a 2-cycle engine by providing an oil pump that acts in response to acceleration and deceleration of the piston to inject a predetermined amount of oil between the piston and the piston cylinder liner.

It is another object of the present invention to provide an improved lubricating system and method for a 2-cycle engine by providing an inertia pump within each piston to inject a predetermined amount of oil into the piston cylinder at the top dead center position of each piston.

It is a further object of the invention to provide an inertia pump that utilizes a single movable component to provide the valving and pumping functions.

It is a further object of the present invention to provide several embodiments with check valves, throttle valves and sliding elements to achieve operating alternatives.

DETAILED DESCRIPTION OF EMBODIMENTS OF THE INVENTION

While the present invention is summarized above as being applicable for several types of internal combustion engines, it is exemplified herein as being installed in a 2-cycle OPOC engine, such as that shown in my referenced patent.

Figure 1:
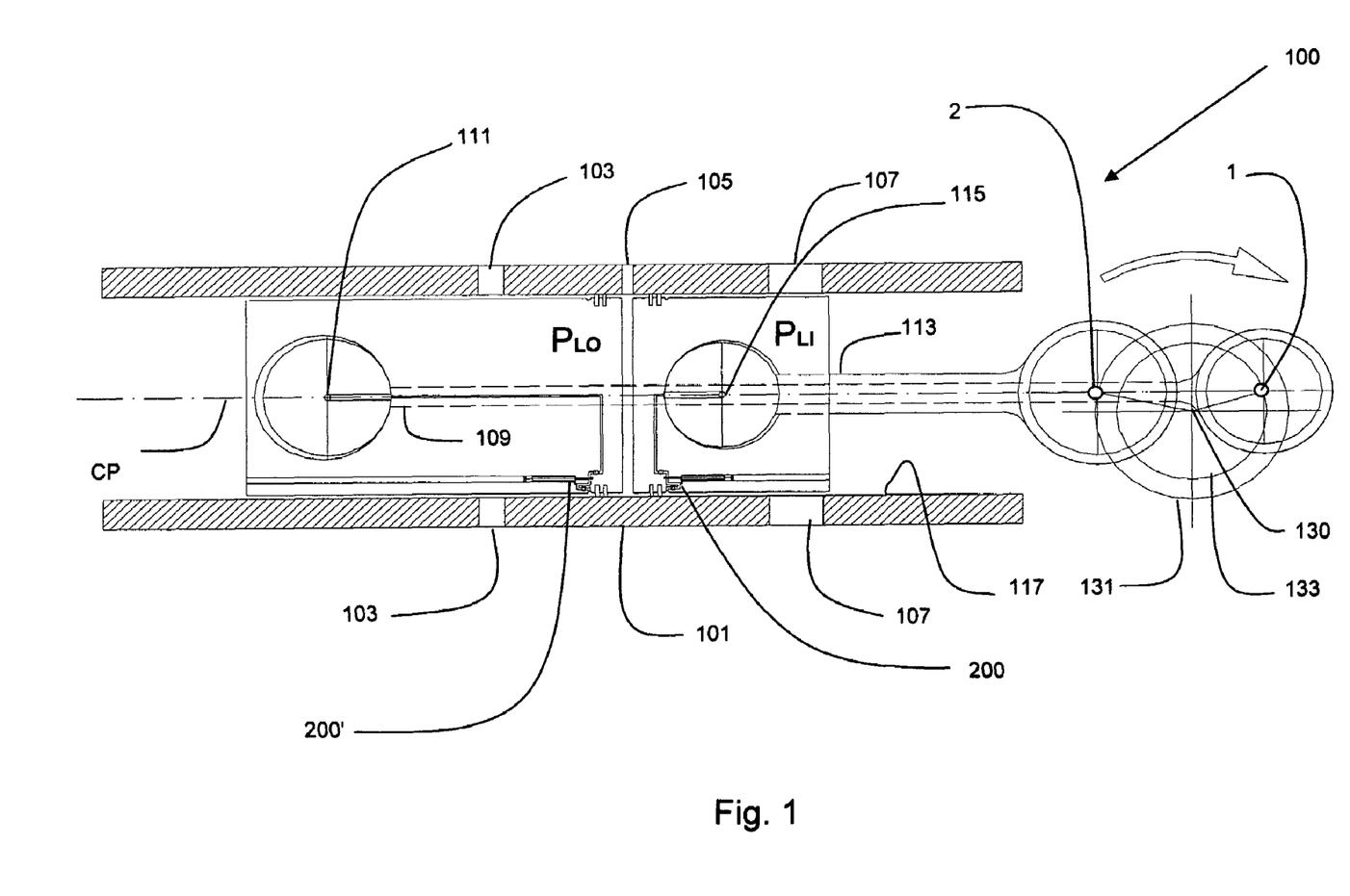
FIG. 1 is an elementary cross-sectional drawing of the left cylinder of a 2-cycle OPOC engine showing the location of the embodiments of the present invention.

In FIG. 1, a single left cylinder 100 of a multi-cylinder OPOC engine is shown with an outer piston $P_{LO}$ and an inner piston $P_{LI}$ at their TDC positions in the cylinder. The pistons are mounted for reciprocating motion within the cylinder 100 and are connected to a single crankshaft centered for rotation on axis 130. The outer piston $P_{LO}$ is connected to the crankshaft via pull rod 109. The pull rod 109 is connected at journal "1" which moves along the circular path 131 when the crankshaft is rotated on its axis 130. (In the actual OPOC engine configuration, there are two pullrods—one on each side of the piston. In this drawing, only one is shown.)

The inner piston $P_{LI}$ is connected to the crankshaft via a single push rod 113 to a journal "2" which moves along the circular path 133 when the crankshaft is rotated clockwise on its axis 130. Other features of the cylinder 100 include inlet ports 103, exhaust ports 107 and a fuel injection port 105. Inertia lubrication pumps 200 and 200' of the present invention are also represented in FIG. 1 and more detail is presented in the subsequent drawings.

Figure 2:
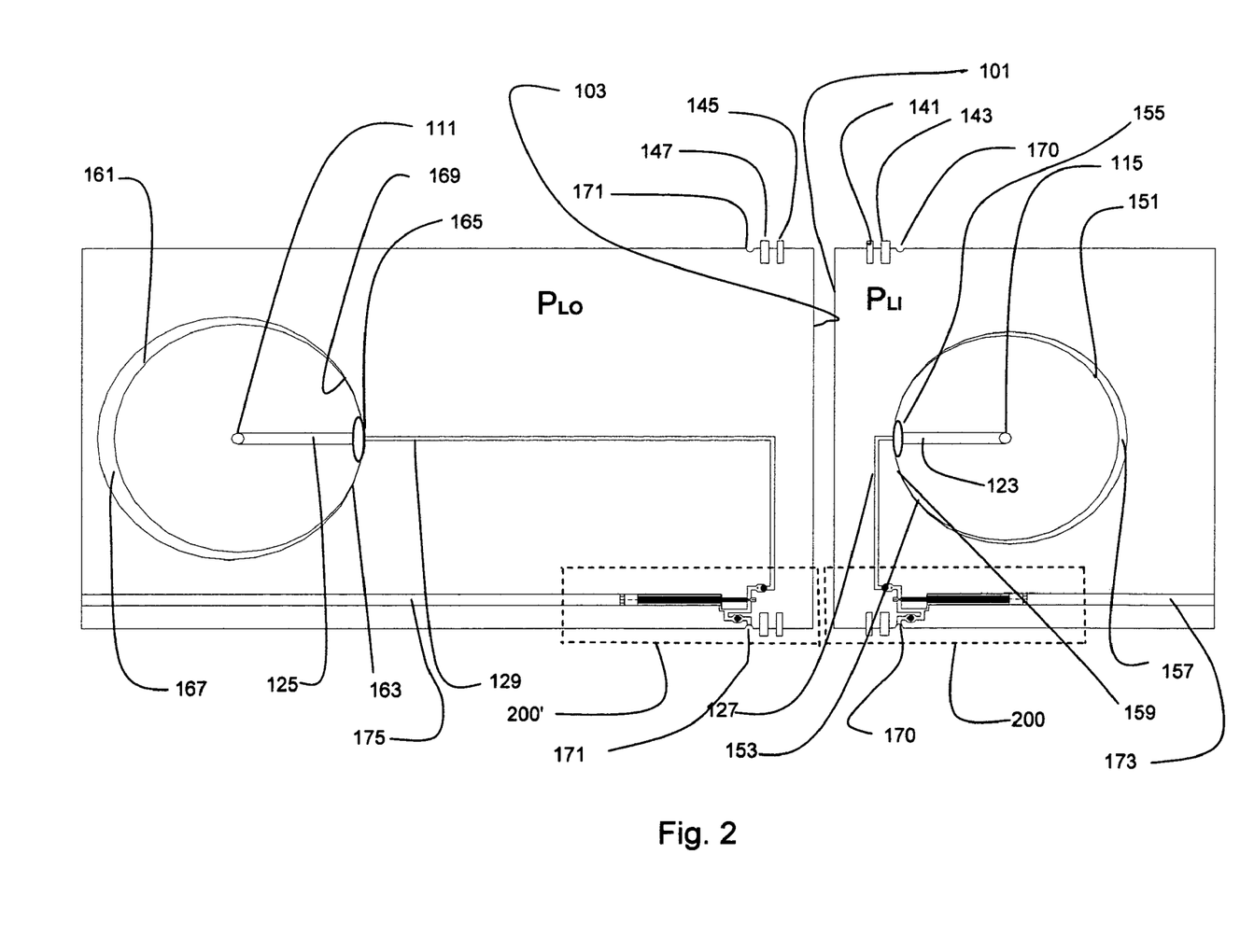
FIG. 2 is an enlarged view of a portion of the OPOC engine shown in FIG. 1 with a first embodiment of the present invention when the pistons are at TDC.

In FIG. 2, the piston arrangement, first embodiment of the inertia lubrication pumps 200 and 200', and associated lubrication system are shown. Inner piston $P_{LI}$ is shown to have an upper set of piston rings 141 and 143 near its face 101. (Most pistons of two stroke engines would also have a lower set of piston rings near the base of the piston, but are not necessary to be shown for purposes of understanding this embodiment.) Similarly, outer piston $P_{LO}$ contains a set of upper piston rings 145 and 147 near its face 103. The piston rings function in a conventional manner to allow linear and low friction movement of the pistons within the cylinder walls or liner 117 while providing an effective gas pressure seal between the defined combustion chamber and the ports below the rings.

In FIG. 2, each of the pistons $P_{LI}$ and $P_{LO}$ contain identical lubrication systems driven by inertia pumps 200 and 200' that function separately during the asymmetrical movement of the pistons during each engine stroke cycle. In the case of the outer piston $P_{LO}$, the oil is injected by the pump 200' through an outlet port into an annular groove 171 formed on the circumference of the piston below the upper set of rings 145 and 147. In the case of the inner piston $P_{LI}$, the oil is injected by the pump 200 through an outlet port into an annular groove 170 formed on the circumference of the piston below the upper set of rings 141 and 143. The outlet port of each inertia lubrication pump 200 and 200' is located at that side of the piston which is most subject to side forces that push the piston against the liner after TDC.

The following explanation focuses on the lubrication system of the inner piston $P_{LI}$ to illustrate the principles involved in the construction and operation of the present invention. However, it is represented that in each of the shown embodiments, the two opposing pumps operate to cause them to each provide a controlled amount of oil to be injected below their upper set of piston rings at or near the TDC position represented in FIG. 2.

Piston $P_{LI}$ contains a cylindrical journal 159 into which a wrist pin 151 is inserted crosswise. The push rod 113 is connected to the wrist pin 151 and provides interconnection between the piston and the crankshaft. The wrist pin 151 is slightly smaller in diameter than the journal 159 and therefore provides an eccentric gap 157 that allows for the wrist pin to oscillate with a slight rocking motion about its axis, when the engine is in operation. The push rod 131 is driven and causes the wrist pin 151 to rock by the motion of the crankshaft journal.

An oil passage 115 is shown in the wrist pin 151 which is in communication with a conventional lubricating oil supply source. The source supplies lubricating oil from a crankcase sump pumped by an oil-pump through passages in the crankshaft, crankshaft journals and connecting rods, to the wrist pins. While that source is normally provided to supply lubricating oil to the wrist pin and the piston journal, the present invention makes use of its presence to provide a source of lubricating oil to the inertia pump 200. An additional oil passage 123 extends from the passage 115 to the outer surface of the wrist pin.

In the piston $P_{LI}$ an oil passage 127 is formed that extends from the journal surface opposite the outlet of wrist pin passage 123. A recess opening 155 is formed on the surface of the wrist pin 151 to provide a transition and constant opening between the relatively moving (rocking) wrist pin passage 123 and linear moving piston passage 127, throughout the engine stroke cycle. Oil passage 127 extends to the inertia pump 200.

The inertia pump 200 is shown in more detail in FIGS. 3 and 4 which show the pump in two extreme stages: 3) becoming primed with an oil volume when the piston is near BDC; and 4) pumping a controlled volume of lubricating oil just below the piston rings when the piston is near TDC.

Inertia pump 200 is shown to include a two stage pump bore that includes a leakage drain bore section 213 and a plunger bore or displacement chamber 215. A two stage plunger element resides within the pump bore and includes an unbiased plunger mass portion 217 that resides totally in bore section 213 and a pump plunger portion 219 that extends from plunger mass portion 217 to move within displacement chamber 215. A stopper element 247 is located at one end of bore section 213 to limit movement of the plunger element therein. Stopper element 247 includes a central opening 249 through which excess oil can escape through an escape passage 173 (see FIG. 2) that leads through the piston and allows excess oil to return through a passage in the piston to the crankcase sump (not shown).

Piston oil passage 127 connects to an oil feed passage 205 in the inertia pump 200 through an open (normally closed) check valve 203 when the piston is near BTC. Oil feed passage 205 is in open communication with displacement chamber 215, as well as to a spill passage 207 and a normally closed check valve 209 (shown in its closed position). Spill passage 207 leads back to bore section 213. Pump outlet passage 209 extends from check valve 209 to annular groove 170 formed on the piston surface adjacent to and below piston rings 141 and 143.

Figure 10:
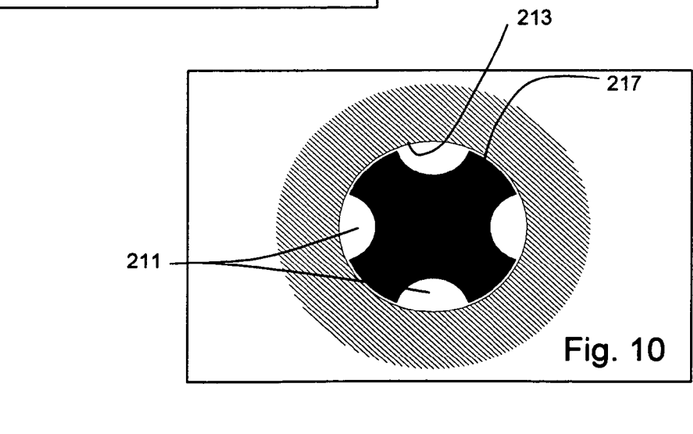
FIG. 10 is a cross-sectional view of the pump plunger mass, of the first embodiment taken along Section lines A-A in FIG. 3.
Figure 11:
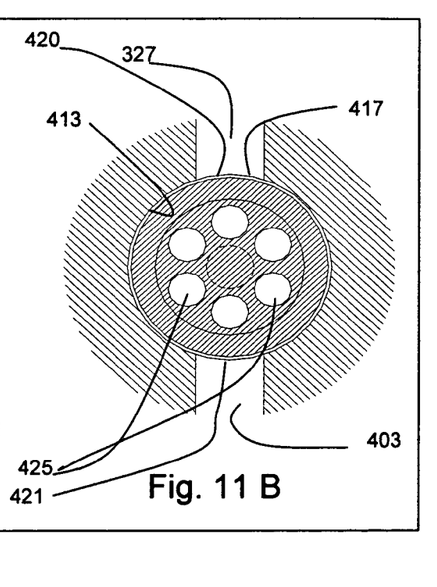
FIG. 11A is cross-sectional view of the pump plunger mass, of the second embodiment taken along Section lines A-A in FIG. 7.
FIG. 11B is cross-sectional view of the pump plunger mass, of the second embodiment taken along Section lines B-B in FIG. 8.

The plunger mass portion 217 of the plunger element contains longitudinally formed grooves 211. (See FIG. 10 for a cross-sectional view taken along section lines A-A in FIG. 3.) The grooves 211 function to lower the resistance of the plunger mass when it is moved by inertia within the bore by allowing oil that is within the bore section 213 to flow through the grooves.

As mentioned earlier, FIGS. 3 and 4 show the inertia pump in two distinct positions. In FIG. 3, piston $P_{LI}$ is shown as having entered into the later part of its expansion/power stroke when it is approaching BDC, as well as the initial part of its compression stroke when the inertia forces are high (See FIG. 5 graph "$P_{LI}$"), causing the plunger element to be moved to the far right end of the bore and against stop 247. In FIG. 4, piston $P_{LI}$ is shown as having entered into the later part of its compression/exhaust stroke when it is approaching TDC, as well as the initial part of its expansion stroke when the inertia forces are high (See FIG. 5 graph "$P_{LI}$"), causing the plunger element to be moved to the far left end of the bore and against bore end wall 251.

Figure 5:
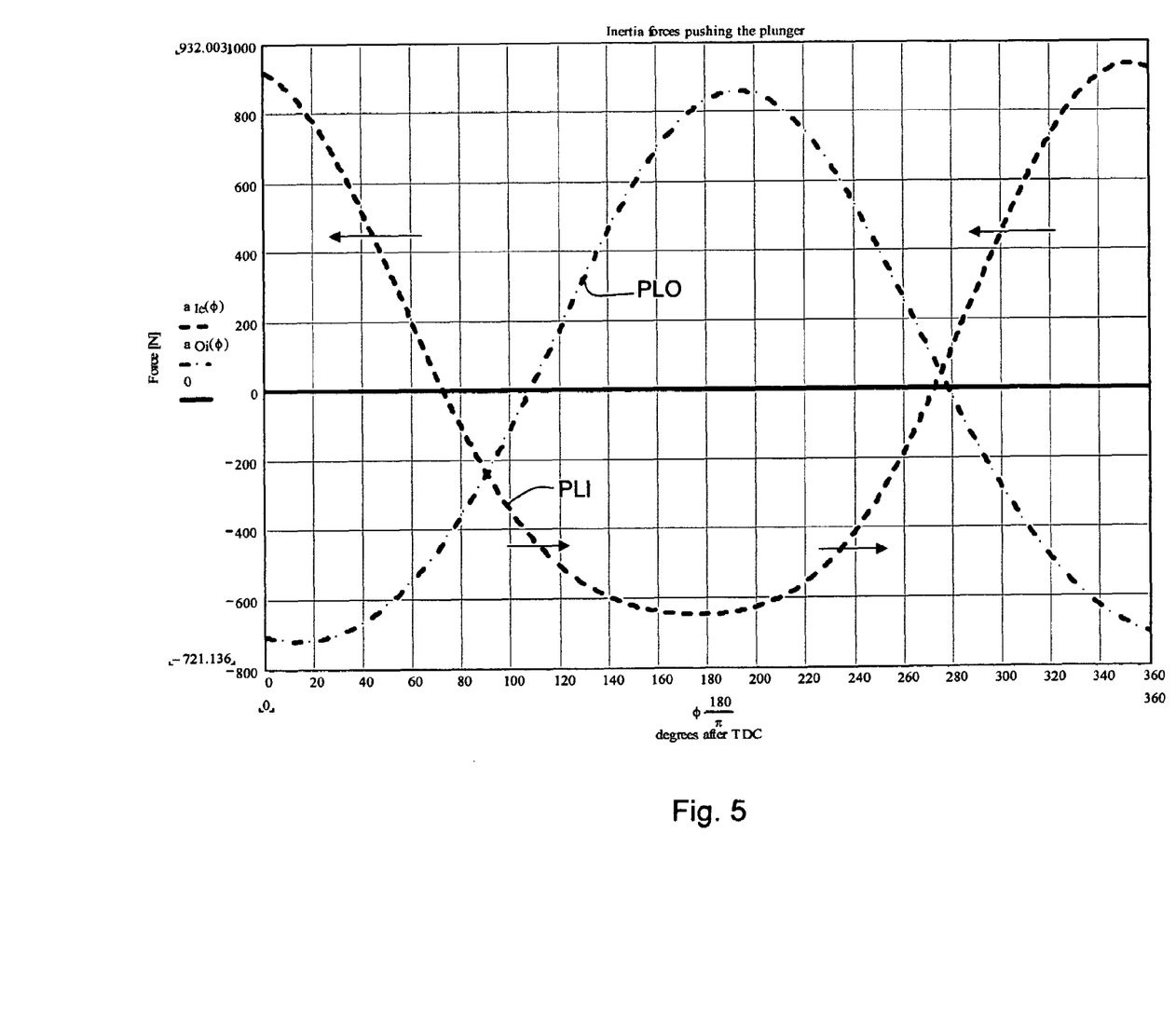
FIG. 5 is a chart showing the inertia forces present on an inertia pump plunger during a full stroke cycle of pistons in a 2-cycle engine containing the present invention.

As the piston moves through its stroke cycle it changes speeds and therefore creates inertia forces that are graphed in FIG. 5 for an engine that was running at approximately 4000 rpm. Referring to the $P_{LI}$ plot, inertia forces prior to and after reaching BDC (180° on the chart) cause the plunger element to be forced to the right of the bore. This occurs between approximately 60 degrees prior to BDC when the piston is decelerating at the end of its power stroke and 40 degrees following BDC and when the piston is accelerating at the beginning of its compression stroke. Contrastingly, inertia forces prior to and after reaching TDC (0° and 360° on the chart) cause the plunger to be forced to the left of the bore. This occurs between approximately 60 degrees prior to TDC when the piston is decelerating at the end of its compression stroke and 40 degrees following TDC and when the piston is accelerating at the beginning of its expansion stroke.

Figure 3:
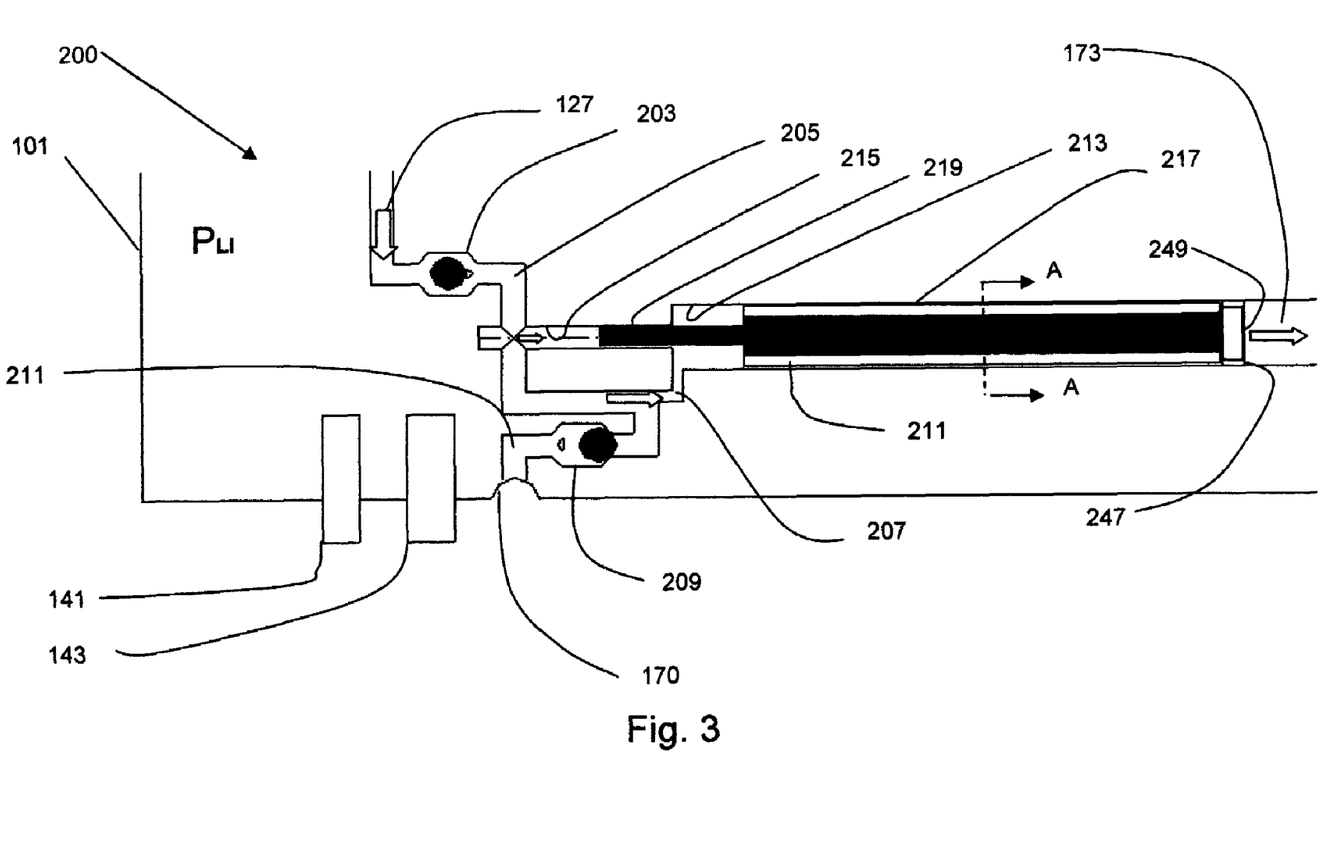
FIG. 3 is a cross-sectional view of the first embodiment of the present invention as located in the left inner piston, of the OPOC engine shown in FIG. 2, shown in its BDC position.

During the phases of the stroke nearing BDC, the plunger mass is moved within the bore section 213 to the point shown in FIG. 3. As it is moving right, it draws a negative pressure on the check valve 203; causing check valve 203 to open and allow lubricating oil from the pressurized source to flow from passage 127 to the now expanded displacement chamber 215. Any excess oil that flows through check valve 203 flows through spill passage 207 and into bore section 213 as it is expanding and also through the plunger grooves 211 to escape through aperture 249 and passage 173. Even after the plunger 217 reaches stop 247, excess oil is allowed to flow through the spill passage 207 and escape through passage 173. When plunger 217 reaches stop element 147 the pump is fully primed with a predetermined charge of lubricating oil. The inertia forces acting on the moving masses of the check valves support the function of the valves, in addition to the pressure differences.

Figure 4:
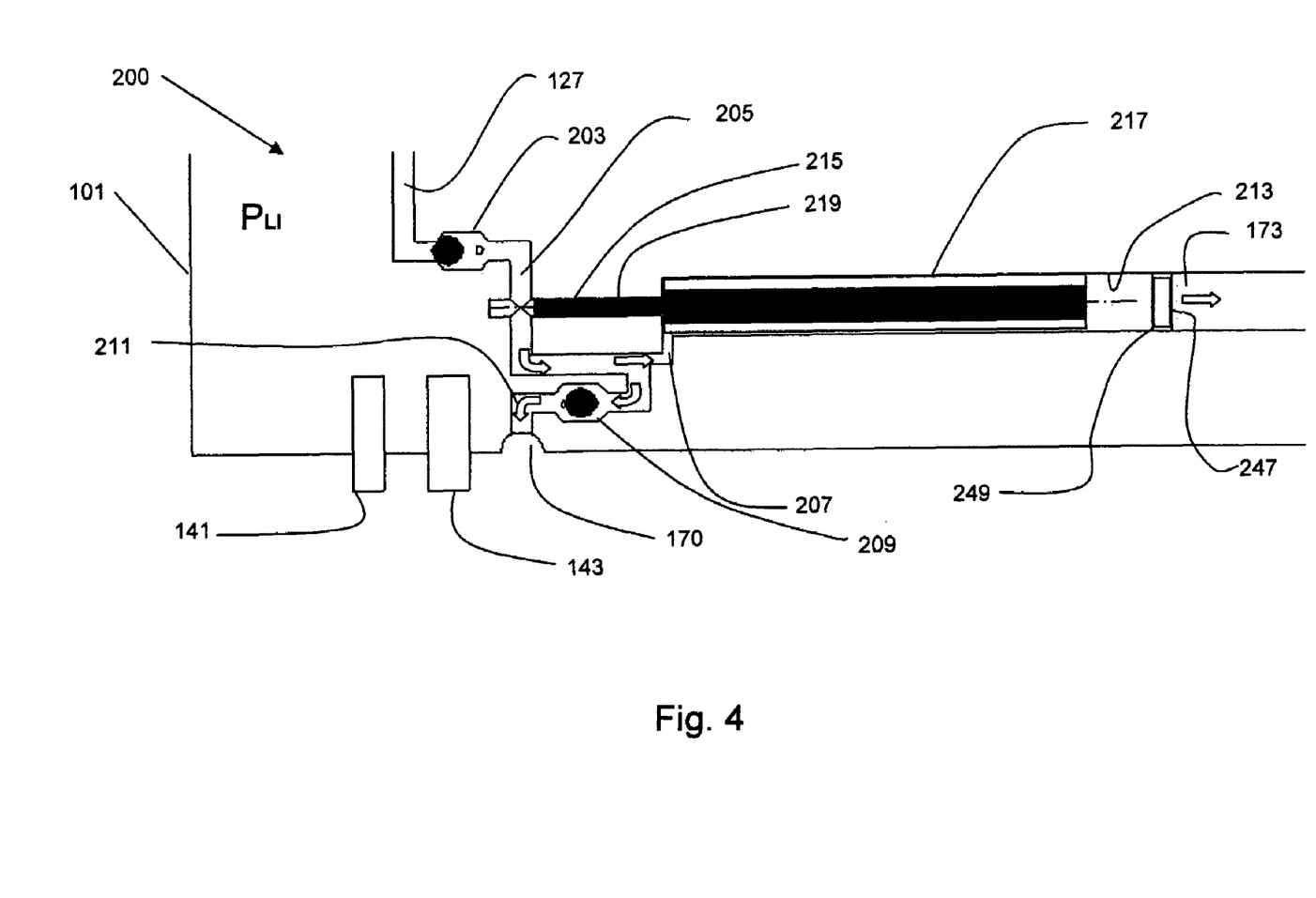
FIG. 4 is a cross-sectional view of the first embodiment of the present invention as located in the left inner piston, of the OPOC engine shown in FIG. 2, shown in its TDC position.

During the phases of the stroke nearing TDC, the pressure and the inertia forces cause check valve 203 to close and inertia forces cause the plunger mass to be moved within the bore section 213 to the point shown in FIG. 4. As it is moving left, the plunger mass creates a positive pressure on the oil in displacement chamber 215 and check valve 209. The pressure and the inertia forces cause check valve 209 to open. A small amount of lubricating oil flows into passage 211 and through the outlet port into the annular groove 170. Because the sizes of the plunger, the associated bore volume and the spill passage 207 are precisely selected, one can rely that a small predetermined volume of lubricating oil will be injected from the outlet port into the annular groove 170 for the selected engine application, while excess oil is allowed to escape through spill passage 207. In addition, this configuration ensures that lubricating oil is properly injected into the cylinder just below the upper rings and at the appropriate time in the cycle: TDC.

Although the first embodiment shows the use of a check valves 209 and 203, other valve techniques are also appropriate, such as a miniature throttle valve that functions to offer a higher resistance to oil flow in one direction as compared to lower resistance to oil flow in the opposite direction. Uses of such valves are shown in the third and fourth embodiments described below.

A second embodiment of the present invention is described in conjunction with FIGS. 6-9, 11A and 11B. In this embodiment, the inertia pump is configured to have only one moving part—the plunger mass element. All valving functions are accomplished by the configurations of the oil passage openings to the plunger bore and the plunger mass element.

Figure 6:
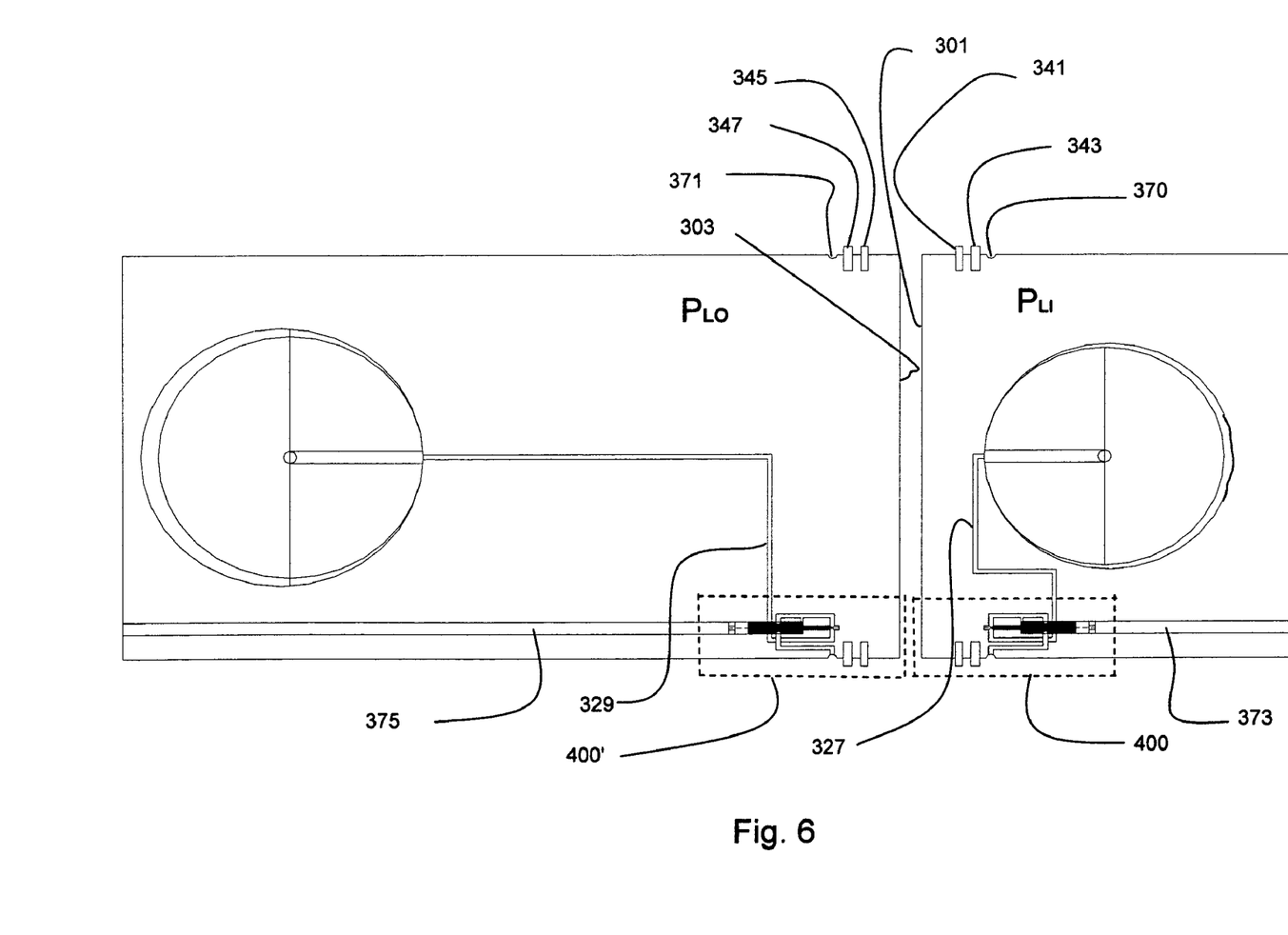
FIG. 6 is an enlarged view of a portion of the OPOC engine shown in FIG. 1 with a second embodiment of the present invention when the pistons are at TDC.

In FIG. 6, the left inner and outer pistons (P$_{LI}$ and P$_{LO}$) are shown at their TDC positions in their respective stroke cycles. All elements of the pistons correspond to those described with respect to the first embodiment except the inertia pumps 400 and 400'. In addition, piston oil passages 327 and 329 are routed differently within the pistons P$_{LI}$ and P$_{LO}$. However, such routing is merely for illustration purposes and is not restrictive to the defined invention.

Figure 7:
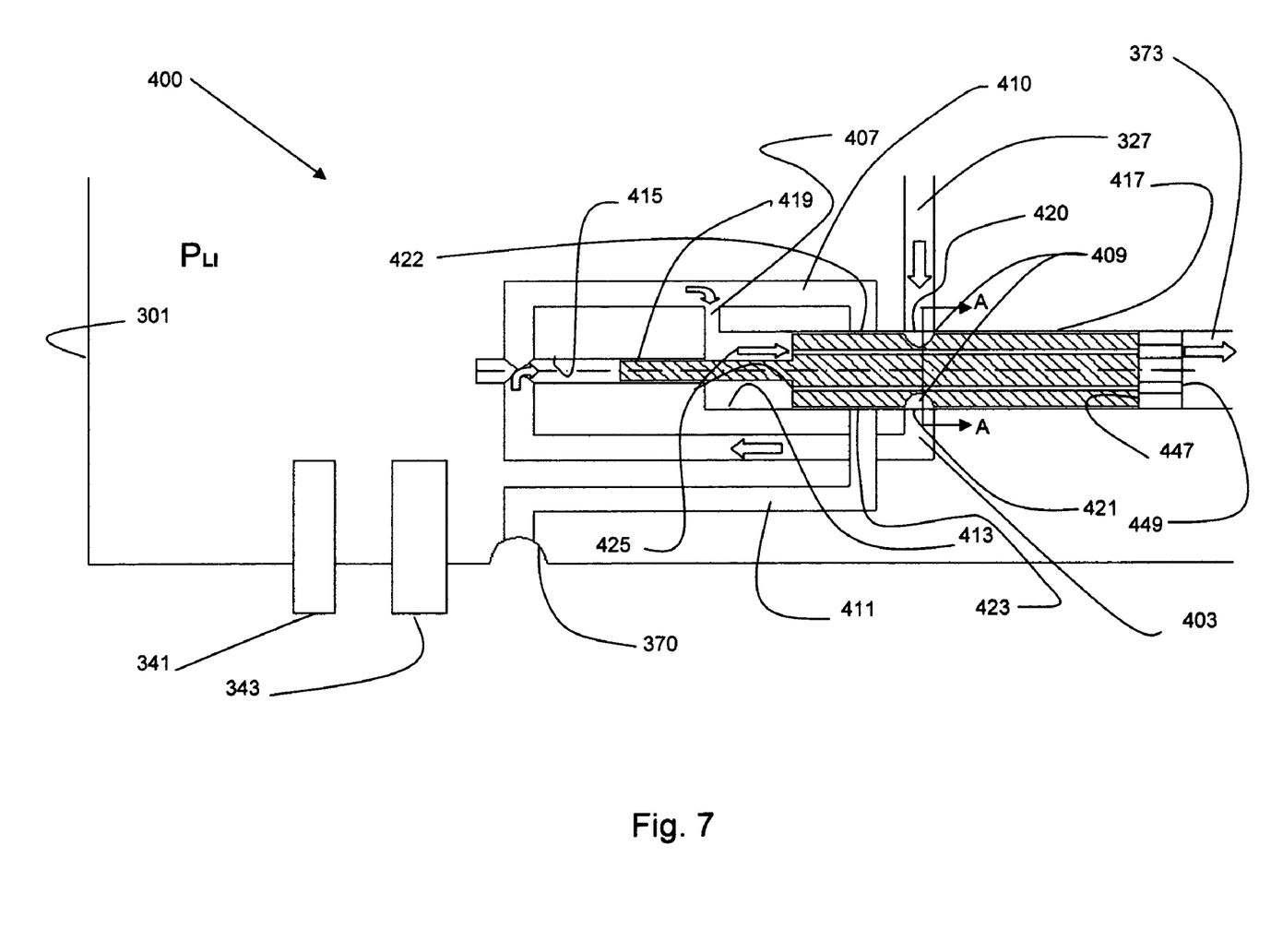
FIG. 7 is a cross-sectional view of the second embodiment of the present invention as located in the left inner piston, of the OPOC engine shown in FIG. 6, shown in its BDC position.

Inertia pump 400 is shown in FIG. 7 to include a two stage pump bore that includes a leakage drain bore section 413 and a displacement chamber 415. A two stage plunger element resides within the pump bore and includes a plunger mass portion 417 that resides totally in bore section 413 and a pump plunger portion 419 that extends from plunger mass portion 417 to move within displacement chamber 415. A stopper element 447 is located at one end of bore section 413 to limit movement of the plunger element therein. Stopper element 447 includes a central opening 449 through which excess oil can escape through an escape passage 373 that leads through the piston and allows oil to return to the crankcase sump.

Piston oil passage 327 connects to an oil feed passage 403 through ports 420 and 421 formed in the plunger bore section 413 when an annular groove 409 formed in the plunger mass portion 417 is aligned therewith (FIG. 7 shows ports 420 and 421 to be opened). Oil feed passage 403 connects to displacement chamber 415, and also to a spill passage 407, a passage 410 and port 422 also formed in the plunger bore section 413. Spill passage 407 leads back to plunger bore section 413. Port 423 is formed in plunger bore section 413 to be directly below port 422 and is in communication with pump outlet passage 411 (FIG. 7 shows ports 422 and 423 closed). Pump outlet passage 411 extends from port 423 to annular groove 170 formed on the piston surface below rings 341 and 343.

The plunger mass portion 417 of the plunger element contains a plurality of longitudinally formed aperture passages 425 which extend between the end faces of the plunger mass portion. (See FIG. 11A for a cross-sectional view taken along section lines A-A in FIG. 7.) The aperture passages 425 function to lower the resistance of the plunger mass when it is moved by inertia within the bore by allowing oil that is within the bore section 413 to flow through the aperture passages.

Figure 8:
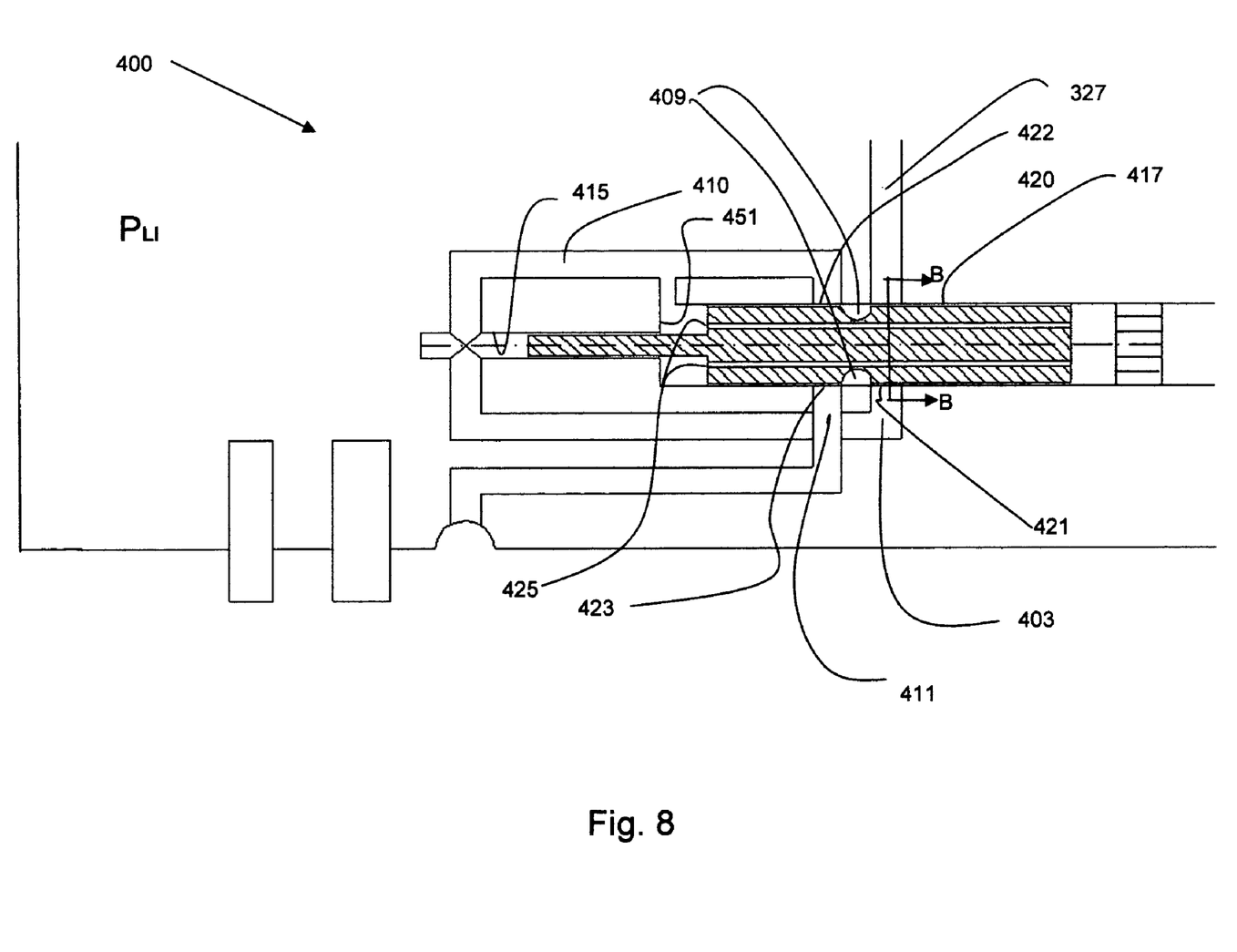
FIG. 8 is a cross-sectional view of the second embodiment of the present invention as located in the left inner piston, of the OPOC engine shown in FIG. 6, shown in an intermediate position within the stroke cycle.
Figure 9:
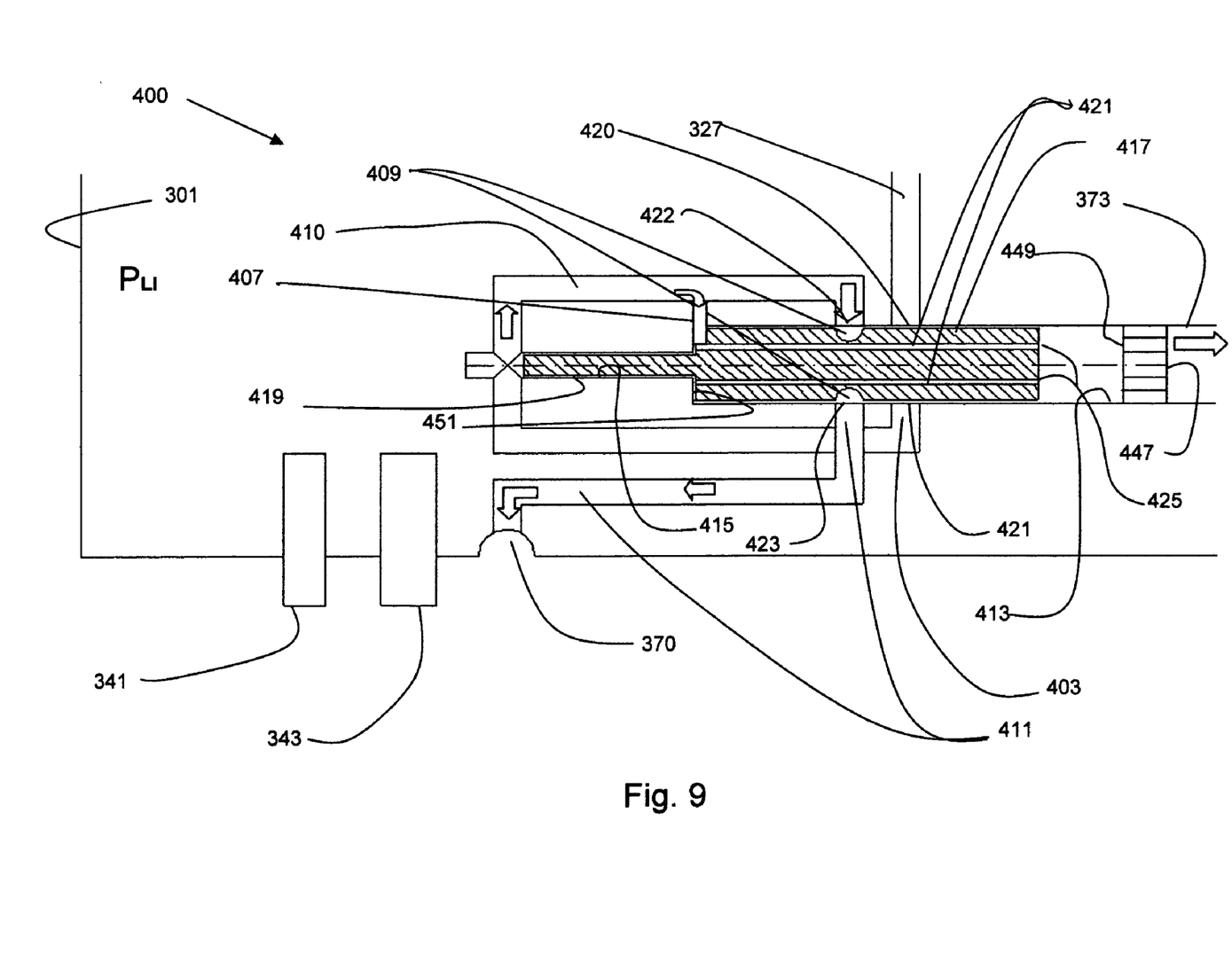
FIG. 9 is a cross-sectional view of the second embodiment of the present invention as located in the left inner piston, of the OPOC engine shown in FIG. 6, shown in its TDC position.

FIGS. 7, 8 and 9 show the inertia pump in three distinct states. In FIG. 7, piston P$_{LI}$ has entered into the later part of its expansion stroke when it is approaching BDC, as well as the initial part of its compression stroke when the inertia forces are high (See FIG. 5 graph "P$_{LI}$"), causing the plunger element to be moved to the far right end of the bore and against stop 447. In FIG. 8, piston P$_{LI}$ has started to enter into the mid-portion of the compression stroke when deceleration forces cause the inertia of the plunger to move it left (from FIG. 7) to close off ports 420 and 421 and maintain ports 422 and 423 closed as well. In FIG. 9, piston P$_{LI}$ has entered into the later part of its compression stroke when it is approaching TDC, as well as the initial part of its expansion stroke when the inertia forces are high (See FIG. 5 graph "P$_{LI}$"), causing the plunger element to be moved to the far left end of the bore and against bore end wall 451.

During the phases of the stroke nearing BDC, the plunger mass is moved within the plunger bore to the point shown in FIG. 7. As it is moving right, and the annular groove 409 is registered between ports 420 and 421, it creates an open valve that allows lubricating oil from the pressurized source to flow from passage 327 to passage 403 and the now expanded displacement chamber 415. Any excess oil that flows through open valve flows through spill passage 407 and into bore section 413 as it is expanding and also through the plunger aperture passages 425 to escape through aperture 449 and passage 373. At that point, excess oil can continue to flow through the plunger aperture passages 425 and passage 373.

As the cycle continues, the inertia forces cause the plunger element shown in FIG. 8 to move left and thereby close all the ports until the plunger has been forced by inertia to its full left position as shown in FIG. 9. Of course, FIG. 8 is also illustrating the position of the piston when the stroke cycle is causing the plunger to be forced by inertia to move right from its FIG. 9 position and before it again reaches its FIG. 7 full right position.

During the phases of the stroke nearing TDC, valve ports 420 and 421 remain closed and inertia forces cause the plunger mass to be moved within the plunger bore to the point shown in FIG. 9. As it is moving left, the plunger mass creates a positive pressure on the oil in displacement chamber 415 and forces it to flow through the open valve created between ports 422 and 423. The pressure forces a small predetermined measured volume of lubricating oil into passage 411 and through the outlet port into annular groove 370. Excess oil escapes through spill passage 407 and passage 373.

As in the first embodiment, the sizes of the plunger, the associated bore volume and the spill passage 407 are precisely selected so that one can rely that a predetermined volume of lubricating oil will be injected from the outlet port and into the annular groove 370 for the selected engine application. This configuration also will ensure that lubricating oil is properly injected into the cylinder just below the upper rings and at the appropriate time in the cycle: TDC.

Figure 12A:
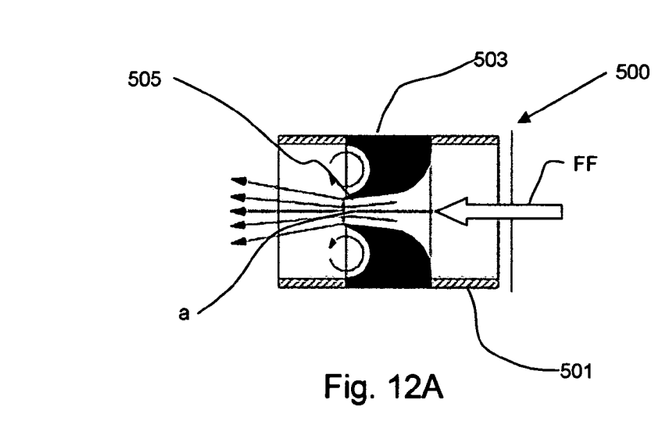
FIGS. 12A and 12B are cross-sectional elevation views of a throttle valve such is employed in other embodiments of the present invention being respectively exposed to forward and reverse flow forces.
Figure 12B:
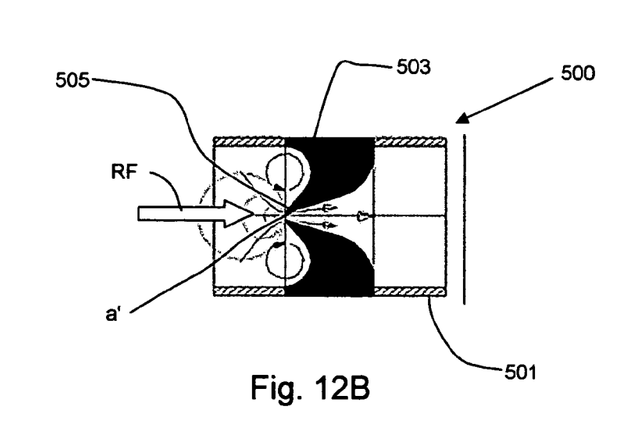

In FIGS. 12A and 12B a throttle valve 500 is shown in relatively open and closed positions, respectively. In both FIGS. 12A and 12B, the throttle valve 500 is shown as formed from a solid cylinder 501 and a flexible annular restriction element 503. The restriction element 503 is formed to define a forward flow direction for liquid through its center opening. The opening 505 in the restriction element 503 is formed with a relatively thin lip portion to allow fluid flow forces to affect the opening size and therefore the resistance to flow. In FIG. 12A, forward flow forces "FF" are indicated which cause valve 500 to have its center opening 505 expanded from its normal condition to a diameter (a) and to be in its open state. In FIG. 12B, reverse flow forces "RF" are indicated which cause the valve 500 to have its center opening 505 forced down to a diameter (a') (wherein a' is less in diameter than a) and to be in its relatively closed state. Although not fully closed in FIG. 12B, but wih a reduced opening a', the valve 500 becomes more restrictive to reverse flow and for purposes of this description is said to be relatively closed in order to distinguish it from its open position when exposed to forward flow forces.

Figure 13A:
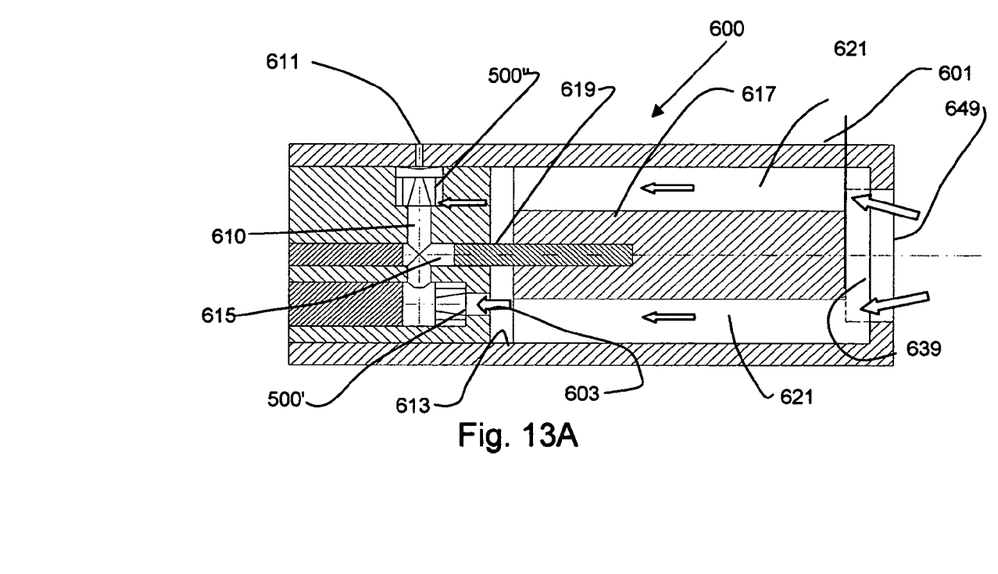
FIG. 13A is a cross-sectional elevation view of a third embodiment of an inertia pump of the present invention.
Figure 13B:
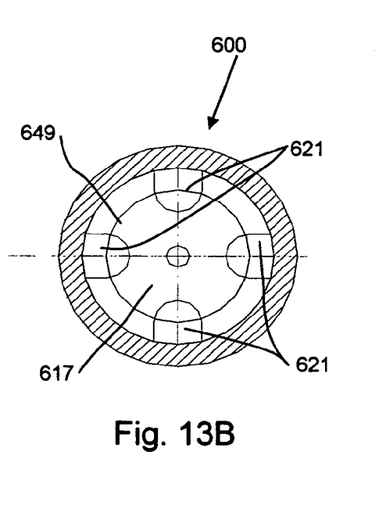
FIG. 13B is an end view of the inertia pump embodiment shown in FIG. 13A.

In FIGS. 13A and 13B, a third embodiment of the invention is shown. In this embodiment, an inertia pump 600 employs a pair of throttle valves 500' and 500" such as depicted in FIGS. 12A and 12B. Although not depicted in a piston of an internal combustion engine, this embodiment is an alternative to those shown earlier and is well suited for inclusion in such a piston. A housing 601 is provided for the pump elements and passages. Inside housing 601, a large bore 613 is formed to provide a defined space to house the pump plunger mass element 617. A pump displacement chamber 615 is formed to allow for movement of a pump plunger extension 619 to move therein. A passage 603 is formed to communicate with bore 613 and a first throttle valve 500' which is referred to as the inlet valve, oriented for low resistance to flow of oil from the bore 613 (open). Passage 610 provides communication between inlet valve 500' and displacement chamber 615. Passage 610 also communicates with a second throttle valve 500" which is referred to as the outlet valve and is oriented for low resistance flow of oil from passage 610 to an outlet 611 (closed). The opposite end of large bore 613 contains a stop element 639 to limit the movement of the plunger mass element in its movement to recharge the pump. An opening 649 is formed within stop 639 to allow oil to pass from the source to the pump, as indicated by the flow arrows. The plunger mass element 617 is formed generally as a cylinder with a plurality of open longitudinal flutes or grooves 621 formed along its length. The flutes 621 allow for both a flow of oil from the source to the passage 603 and movement of the plunger mass element 617 in response to inertia forces, as has been discussed in the earlier embodiments.

In this embodiment, as the associated piston ($P_{LI}$) approaches its BDC position, and deceleration occurs, plunger mass element is forced to its extreme right position within bore 613. In doing so, plunger extension 619 also moves to the right and causes a vacuum to be developed in the displacement chamber 615 which pulls oil through inlet passage 603 and open inlet valve 500'. The same vacuum is present at outlet valve 500", but since it is a reverse force applied to the valve, the amount of oil and vapor being pulled into passage 610 is very small in comparison to the amount of oil provided from the source and through inlet valve 500'. Therefore, the outlet valve is considered effectively closed during the recharging of the pump.

As the piston associated with the embodiment shown in FIGS. 13A and 13B approaches its TDC and decelerates, the plunger mass is driven to the left by the inertia forces. Plunger extension 619 also is driven to the left to cause a predetermined measure of oil to be forced through the open outlet valve 500" and outlet 611. Excess oil is forced through the inlet valve 500' in a reverse direction, passage 603 and into the bore 613 as a relief to the pressure in the pump passage 610 and to prevent an excess of oil from being injected into the cylinder ring area. Although inlet throttle valve 500' is considered relatively closed when reverse flow pressure is applied as the piston approaches TDC, the valve is sized to allow sufficient oil to flow through to relieve the pressure in the pump while allowing the proper amount of oil to be forced through outlet valve 500" and outlet 611 to lubricate the piston rings.

Figure 14A:
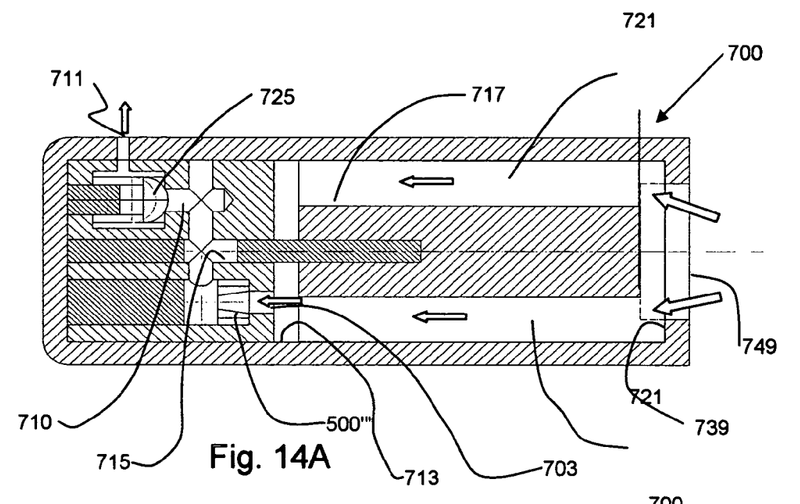
FIG. 14A is a cross-sectional elevation view of a fourth embodiment of an inertia pump of the present invention.
Figure 14B:
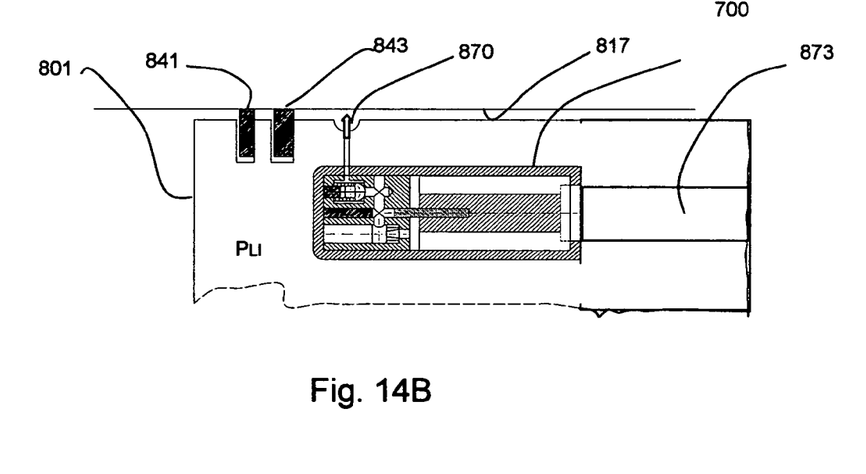
FIG. 14B is a cross-sectional elevation view of the fourth embodiment inertia pump installed in a the inner left piston of an internal combustion engine.

A fourth embodiment of the present invention is shown in FIGS. 14A and 14B, as inertia pump 700 located in left inner piston $P_{LI}$. Piston face 801, piston rings 841 and 843 are indicated to the left of (and above) the piston oil outlet port 870 adjacent cylinder wall 817 in FIG. 14AB. In this embodiment, a normally closed check valve 725 is utilized as the pump outlet valve. A throttle valve 500''' is employed as the inlet valve, similar to that shown in the third embodiment. The fourth embodiment functions in the same manner as the third embodiment, with the exception that the outlet valve 725 is completely closed while the pump is charging (piston $P_{LI}$ approaching and leaving BDC). This prevents vapor or other non-oil elements from being sucked into the outlet passage while the pump is charging and a vacuum is developed in pump displacement chamber 715. The inlet valve 500''' functions in the same manner as in the third embodiment to provide relief for excess oil to flow in a reverse direction from oil passage 710, to inlet passage 703 and into bore 713. Like the third embodiment, the pump mass element 717 is generally cylindrical in shape to slide reciprocally in bore 713 in response to the induced inertia forces from the associated piston. Flutes or grooves 721 are like those shown in the third embodiment.

From the foregoing, it can be seen that there has been brought to the art a new and improved system and method for lubricating the piston rings and associated surfaces of a piston and cylinder in an internal combustion engine. It is to be understood that the preceding description of the embodiments is merely illustrative of some of the many specific embodiments that represent applications of the principles of the present invention. Clearly, numerous and other arrangements would be evident to those skilled in the art without departing from the scope of the invention as defined by the following claims.

The invention claimed is:

1. A system for lubricating the upper piston rings of a piston and inner cylinder wall of an internal combustion engine and providing a predetermined measure of lubricating oil into said cylinder comprising:
   a piston configured to provide communication and passage of lubricating oil from an oil supply source to an outlet port on the piston wall that allows oil to enter into the space between said piston wall and the cylinder wall adjacent to said upper piston rings;
   a pump installed within said piston that is in communication to receive said lubricating oil within said piston and force a portion of said oil to said outlet port, and
   said piston is configured to provide a spill pathway for allowing excess oil that is not forced through said outlet port to return to said source.

2. A system as in claim 1, wherein said pump reacts to the movement of said piston to force a predetermined measure of lubricating oil to said outlet port and into said space as said piston approaches top dead center of its stroke cycle.

3. A system as in claim 1, wherein said pump is an inertia pump containing an unbiased plunger mass element which moves in opposing longitudinal directions in response to the inertia induced by the acceleration and deceleration movement of said piston to force a predetermined measure of lubricating oil to said outlet port and into said space as said piston approaches top dead center of its stroke cycle.

4. A system as in claim 3, wherein said inertia pump contains valves which are effected by inertia forces induced by movement of said piston to open and close at prescribed times of said stroke cycle to allow said pump to become charged with oil and to allow said oil to be forced into said space.

5. A system as in claim 3, wherein said plunger mass is contained within a bore that is configured with apertures and said plunger mass is configured with internal passages to co-act with the location of said bore apertures to provide a valving function in which inertia forces induced by movement of said piston cause said mass to open and close apertures and passages at prescribed times of said stroke cycle, cause said pump to become charged with oil and cause said oil to be forced into said space.

6. A system as in claim 3, wherein said pump is configured to become charged with a predetermined volume of lubricating oil as said piston approaches bottom dead center of its stroke cycle.

7. A system as in claim 1, wherein said piston is connected to a wrist pin and a connecting rod for reciprocating motion within said cylinder, and said piston, wrist pin and connecting rod each contain oil passages that are in communication to provide oil from said supply source to said pump.

8. A system as in claim 7, wherein the outer surface of said wrist pin remains in constant contact with an inner surface of said piston and the outlet of said wrist pin oil passage is constantly in communication with the inlet of said piston oil passage during the entire stroke cycle of said piston.

9. A system as in claim 8, wherein said outlet of said wrist pin is configured to be larger than the inlet of said piston oil passage to accommodate the rocking movement that takes place between the outer surface of said wrist pin and inner piston surface during the stroke cycle of said piston while providing said constant communication with said inlet of said piston oil passage.

10. A system as in claim 1, wherein said outlet port on the piston is located adjacent the contact point between said piston rings and said cylinder wall that is determined to be subjected to the greatest side forces during the stroke cycle of said piston.

11. A system as in claim 1, wherein said outlet port on the piston is located adjacent to said upper piston rings and not exposed to combustion gasses during operation of said engine and said piston wall is provided with an annular groove that intercepts said outlet port and is oriented parallel with said piston rings to encircle said piston and allow flow distribution of said lubricating oil around said piston.

12. A method of lubricating the upper piston rings of a piston and inner cylinder wall of an internal combustion engine and providing a predetermined measure of lubricating oil into said cylinder comprising the steps of:
providing a piston configured to provide communication and passage of lubricating oil from a supply source to an outlet port on the outer wall of said piston that allows oil to enter into the space between said outer piston wall and the cylinder wall adjacent to said upper piston rings;
providing a pump within said piston that is in communication to receive said lubricating oil within said piston from said supply source and to force a predetermined measure of said oil to said outlet port at predetermined intervals during the stroke cycle of said piston; and
providing a spill pathway in said piston to be in communication with said pump for allowing excess oil that is not forced through said outlet port to return to said supply source.

13. A method as in claim 12, further including the step of:
charging said pump with a portion of said oil from said supply source as said piston approaches bottom dead center of its stroke cycle; and
said step of forcing said oil to said outlet port occurs as said piston approaches top dead center of its stoke cycle.

14. A method as in claim 12, wherein said pump is provided as an inertia pump containing an unbiased plunger mass element which moves in opposite longitudinal directions in response to the inertia induced by the acceleration and deceleration movement of said piston to force a predetermined measure of lubricating oil to said outlet port and into said space as said piston approaches top dead center of its stroke cycle.

15. A method as in claim 12, wherein said pump is configured to react to the movement of said piston to force a predetermined measure of lubricating oil to said outlet port and into said space as said piston approaches top dead center of its stroke cycle.

16. A method as in claim 15, wherein said inertia pump is provided with valves and said valves are opened and closed at prescribed times during said stroke cycle by inertia induced forces from the reciprocating movement of said piston to allow said pump to become charged with oil and to allow a predetermined portion of said oil to be forced into said space.

17. A method as in claim 15, wherein said pump is provided with a first check valve that is forced open by the inertia induced force of said piston decelerating as it approaches bottom dead center and accelerating as it leaves bottom dead center during its stroke cycle to allow oil from said supply source to flow into and charge said pump; and said first check valve is forced closed when said acceleration forces following bottom dead center diminish below a predetermined amount.

18. A method as in claim 17, wherein said pump is provided with a second check valve that is forced open by the inertia induced force of said piston decelerating as it approaches top dead center and accelerating as it leaves top dead center during its stroke cycle to allow said predetermined measure of oil from said pump to flow through said outlet port and into said space; and said second check valve is forced closed by the inertia forces which cause said first valve to open.

19. A method as in claim 15, wherein said plunger mass is provided within a bore that is configured with apertures and said plunger mass is configured with internal passages to co-act with the location of said bore apertures to provide a valving function in which inertia forces induced by movement of said piston cause said mass to open and close apertures and passages at prescribed times of said stroke cycle, cause said pump to become charged with oil and cause said predetermined measure of oil to be forced into said space.

20. A method of lubricating the upper piston rings of a piston and inner cylinder wall of an internal combustion engine and providing a predetermined measure of lubricating oil into said cylinder comprising the steps of:
providing a piston configured to provide communication and passage of lubricating oil from a supply source to an outlet port of the outer wall of said piston that allows oil to enter into the space between said outer piston wall and the cylinder wall adjacent to said upper piston rings;
providing a pump within said piston that is in communication to receive said lubricating oil within said piston from said supply source and said pump is configured to react to the movement of said piston to force a predetermined measure of lubricating oil to said outlet port and into said space as said piston approaches top dead center of its stroke cycle;
wherein said pump is provided with a first throttle valve that is forced open by the inertia induced force of said piston decelerating as it approaches bottom dead center and accelerating as it leaves bottom dead center during its stroke cycle to allow oil from said supply source to flow into and charge said pump; and said first throttle valve becomes relatively closed when said acceleration forces following bottom dead center diminish below a predetermined amount.

21. A method as in claim 20, wherein said pump is provided with a second throttle valve that is forced open by the inertia induced force of said piston decelerating as it approaches top dead center and accelerating as it leaves top dead center during its stroke cycle to allow said predetermined measure of oil from said pump to flow through said outlet port and into said space; and said second throttle valve remains relatively closed by the inertia forces which cause said first valve to open and allows spill of excess oil towards said source.

22. A system for pumping a predetermined amount of liquid from a liquid source to an outlet port, comprising:

a first mass element configured for reciprocating movement from one extreme position to an opposite extreme position;

said first mass being configured with a first port that is connected to said source of liquid, said outlet port and internal passages that connect between said first port and said outlet port;

a first portion of said passages forming a bore that extends in a direction that is parallel to the direction of reciprocating motion of said first mass element, having a first end communicating with both said first port and said outlet port;

a second portion of said passages forming a pump chamber communicating with both said first port and said outlet port at a first end and with said first end of said bore at a second end;

a second mass element mounted for reciprocating movement in said bore for movement within said bore;

a pump element extending from said second mass element through said first end of said bore and into said pump chamber;

wherein said second mass and said pump element reciprocate within said first mass in response to acceleration forces and deceleration forces produced by the reciprocating movement of said first mass element as it moves towards and away from each extreme position to pump a predetermined measure of liquid through said outlet port.

23. A system as in claim 22, wherein said first mass further includes an escape port; and a third portion of said passages forming a spill pathway between said chamber and said escape port to allow excess liquid that is not pumped through said outlet port to pass through said escape port.

* * * * *